(12) United States Patent
Chen

(10) Patent No.: US 11,454,290 B2
(45) Date of Patent: Sep. 27, 2022

(54) HYDRAULIC BRAKE CALIPER PISTON/PLUNGER TOOL

(71) Applicants: Shu-Hui Chen, Taichung (TW); Oliver Sir, Paradise, CA (US)

(72) Inventor: Shu-Hui Chen, Tainan (TW)

( * ) Notice: Subject to any disclaimer, the term of this patent is extended or adjusted under 35 U.S.C. 154(b) by 776 days.

(21) Appl. No.: 16/407,194

(22) Filed: May 9, 2019

(65) Prior Publication Data

US 2020/0355231 A1 Nov. 12, 2020

(51) Int. Cl.
*F16D 65/00* (2006.01)
*B25B 27/02* (2006.01)

(52) U.S. Cl.
CPC ........ *F16D 65/0043* (2013.01); *B25B 27/026* (2013.01); *F16D 2250/0084* (2013.01)

(58) Field of Classification Search
CPC ......... F16D 65/0043; F16D 2250/0084; B25B 27/026; B25B 27/00; B25B 27/0021
See application file for complete search history.

(56) References Cited

U.S. PATENT DOCUMENTS

| 6,195,863 | B1 * | 3/2001 | Blake | B25B 27/0035 29/266 |
| 6,574,846 | B1 * | 6/2003 | Kang | B25B 27/0035 29/256 |
| 9,174,330 | B2 * | 11/2015 | Chen | B25B 27/0035 |
| 2006/0288861 | A1 * | 12/2006 | Liu | F15B 15/202 91/418 |
| 2008/0083070 | A1 * | 4/2008 | Huang | B25B 27/0035 7/100 |

FOREIGN PATENT DOCUMENTS

GB  2592662 A * 9/2021
WO  WO-2015/181557 A1 * 12/2015

* cited by examiner

*Primary Examiner* — Pamela Rodriguez

(57) ABSTRACT

A hydraulic brake caliper piston/plunger tool includes a handle, a barrel with rear and front tubes, and a shaft. The handle is provided therein with a fluid reservoir and a fluid chamber, and pivotally connected with an operation lever having a plunger inserted into the fluid chamber. The shaft is attached with a piston and fitted through the rear tube, the barrel and the front tube. A return spring is fitted around the shaft in a central hole of the barrel, between the piston and the front tube. A front end of the shaft is adapted to be fitted with an accessory for a disc brake. A rear end of the shaft is adapted to be connected with a turning tool. In use, alternately depressing and releasing the operation lever enables fluid to enter the central hole of the barrel to have the piston together with the shaft moved forward.

8 Claims, 8 Drawing Sheets

HYDRAULIC BRAKE CALIPER PISTON/PLUNGER TOOL

BACKGROUND OF THE INVENTION

1. Field of the Invention

The present invention relates to a hydraulic brake caliper piston/plunger tool and, more particularly, to a hydraulic brake caliper piston/plunger tool that can be applied to all sorts of disc brakes to easily push back a piston/plunger of a disc brake into the associated caliper.

2. Description of the Prior Art

Generally, there are two kinds of existing tools being used to facilitate replacing brake shoes of disc brakes. One kind of tool is featured in a threaded rod that can be rotated to enable the piston/plunger of a disc brake to be pushed back into the associate caliper. Another kind of tool employs an unthreaded rod provided with springs to push back a piston/plunger into the associated caliper. However, these tools are either slow or laborious in operation. Furthermore, since disc brakes are different in the structure of their pistons/plungers, i.e. some disc brakes containing threaded pistons/plungers while other disc brakes containing unthreaded pistons/plungers. These tools cannot be applied to all sorts of disc brakes. Thus, there is room for improvement in the structure of the tools.

SUMMARY OF THE INVENTION

One object of the present invention is to provide a hydraulic brake caliper piston/plunger tool, which can solve the disadvantages of conventional tools.

The hydraulic brake caliper piston/plunger tool generally comprises a handle, a barrel, and a shaft. The handle is provided with a fluid reservoir in a lower section thereof and a fluid chamber in a middle section thereof, and pivotally connected with an operation lever at the middle section. The barrel is coaxially assembled with front and rear tubes respectively at two ends thereof, wherein the barrel and the rear tube are mounted at an upper section of the handle. The shaft is fixedly attached with a piston and fitted through the rear tube, the barrel, and the front tube. A return spring is fitted around the shaft in a central hole of the barrel, between the piston and the front tube. A circumferential passage that communicates with the central hole of the barrel is defined between the shaft and the rear tube. A front end of the shaft is adapted to be fitted with an accessory for a disc brake. A rear end of the shaft is adapted to be connected with a turning tool for turning the shaft. A fluid circuit system is provided in the handle such that the fluid chamber is communicated with the fluid reservoir and the circumferential passage. The operation lever is spring-biased and provided with a plunger inserted into the fluid chamber. In use, alternately depressing and releasing the operation lever enables the plunger to force fluid to flow into the central hole of the barrel by way of the fluid circuit system and the circumferential passage, thus pushing the piston together with the shaft to move forward to push back a piston/plunger of a disc brake.

More specifically, the fluid circuit system includes a first fluid feed passage, a second fluid feed passage, and a fluid supply passage. The first fluid feed passage is defined in the middle section of the handle and connected with the fluid chamber. The second fluid feed passage is defined in the upper section of the handle and connected between the first fluid feed passage and an inlet port of the rear tube that communicates with the circumferential passage. The fluid supply passage is defined in the middle section of the handle and connected between the fluid chamber and the fluid reservoir. Furthermore, a first check valve is provided at the fluid supply passage to ensure fluid to unidirectionally flow from the fluid reservoir to the fluid chamber. A second check valve is provided at the first fluid feed passage to ensure fluid to unidirectionally flow from the fluid chamber to the central hole of the barrel. Each of first and second check valves includes a steel ball urged by a compression spring to normally close the corresponding passage.

More specifically, the operation lever is pivotally connected to a post fixed on the middle section of the handle, and a spring is fitted around the plunger, between the handle and the operation lever, to enable the operation lever to return to its original position when releasing the operation lever.

Furthermore, a control valve is provided at the fluid return passage to control to return to the fluid reservoir. The control valve includes a steel ball, and a knob provided with a threaded stem capable of forcing against the steel ball. In use, turning the knob in one direction opens the fluid return passage, while turning the knob in a reverse direction closes the fluid return passage.

The hydraulic brake caliper piston/plunger tool of the present invention is labor-saving and easy to use and can be applied to all sorts of disc brakes containing threaded or unthreaded pistons/plungers, thus saving the tool cost.

Other objects, advantages, and novel features of the present invention will become more apparent from the following detailed description when taken in conjunction with the accompanying drawings.

DETAILED DESCRIPTION OF THE PREFERRED EMBODIMENTS

To illustrate the objects and advantages of the present invention, a preferred embodiment in conjunction with the accompanying drawings is provided in the following paragraphs.

Figure 1:
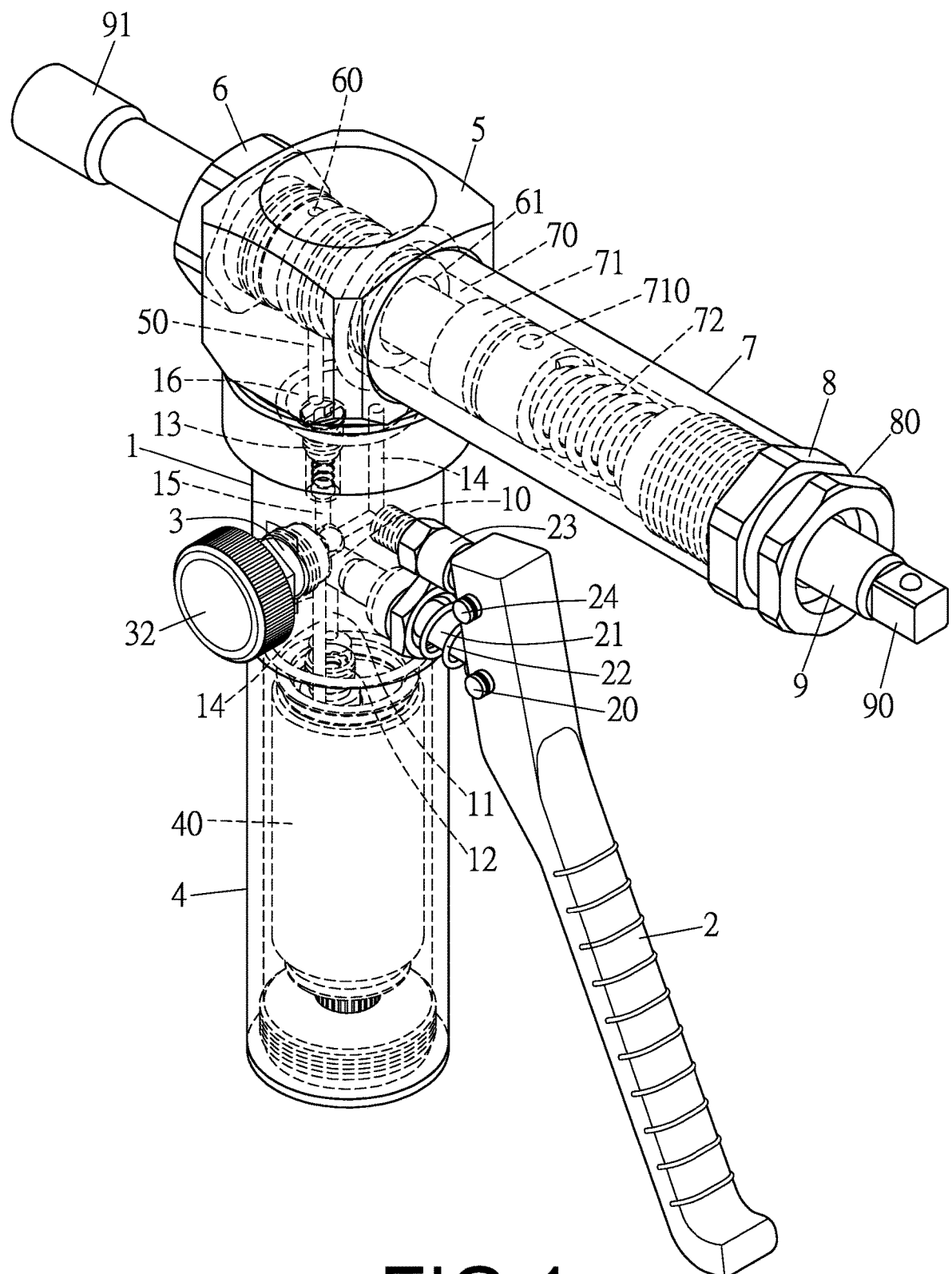
FIG. 1 shows a 3-dimensional view of a hydraulic brake caliper piston/plunger tool according to one embodiment of the present invention.
Figure 2:
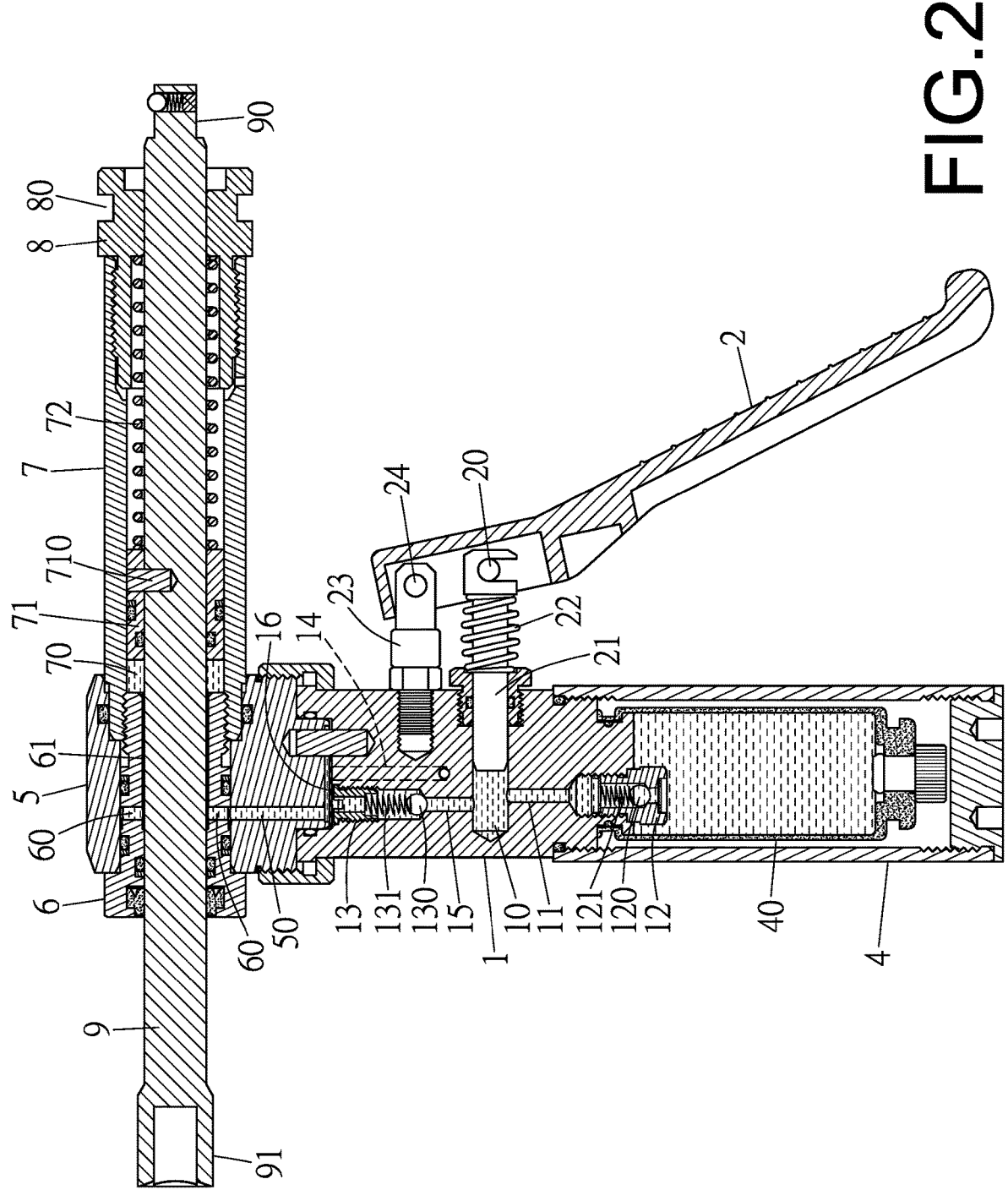
FIG. 2 shows a sectional view of the hydraulic brake caliper piston/plunger tool.
Figure 3:
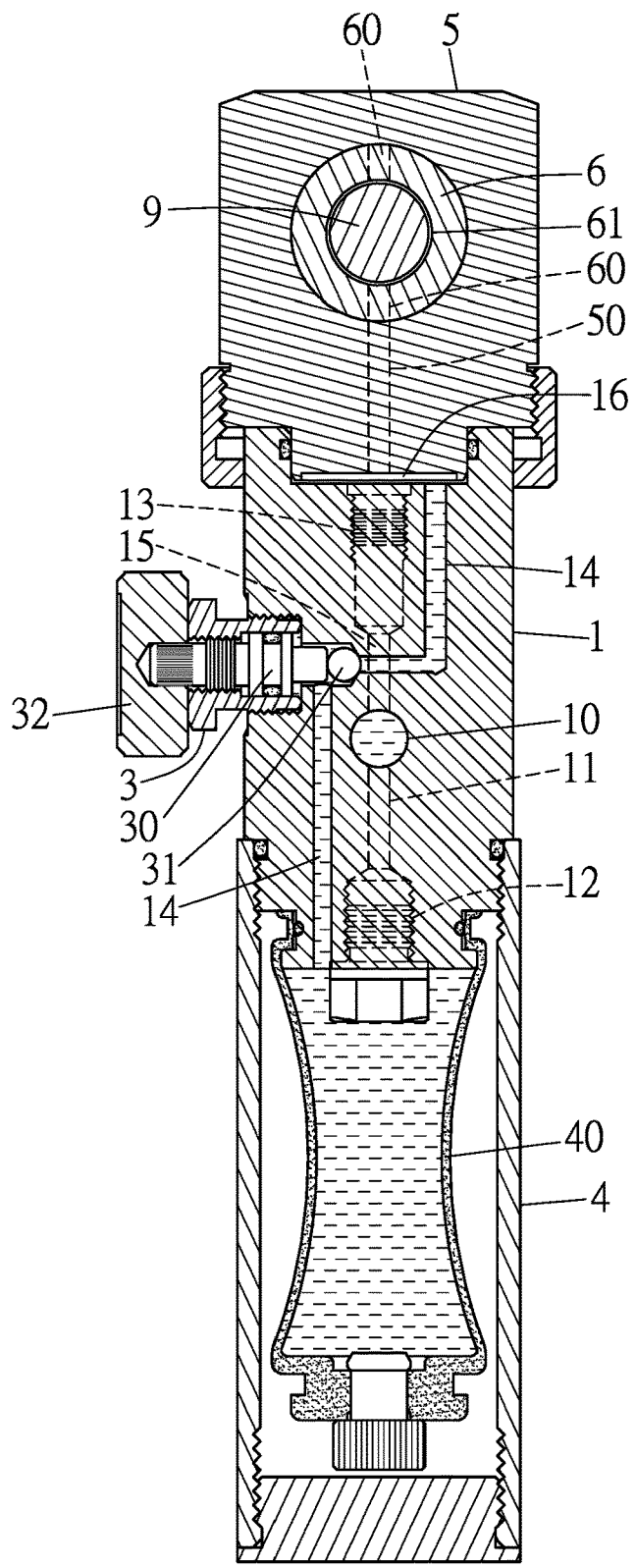
FIG. 3 shows another sectional view of the hydraulic brake caliper piston/plunger tool, wherein a control valve is manifested in structure.

Referring to FIGS. 1 through 3, a hydraulic brake caliper piston/plunger tool according to one embodiment of the present invention is shown, which generally comprises a handle composed of a middle section 1, a lower section 4 and an upper section 5, a barrel 7 with a rear tube 6 and a front tube 8, and a shaft 9. The sections 1, 4, 5 of the handle can be joined together by thread means. The middle section 1 of the handle is provided therein with a fluid chamber 10 and pivotally connected with an operation lever 2, wherein the operation lever 2 is provided with a plunger 21 inserted into the fluid chamber 10, and a spring 22 is fitted around the plunger 21 between the handle and the operation lever 2. The lower section 4 of the handle is provided therein with a fluid reservoir 40. The barrel 7 is coaxially assembled with the front and rear tubes 6, 8 by threads respectively at two ends thereof, wherein the barrel 7 and the rear tube 6 are mounted at the upper section 5 of the handle. The barrel 7 together with the rear and front tubes 6, 8 is mounted substantially perpendicular to the handle. The shaft 9 is fixedly attached with a piston 71 and fitted through the rear tube 6, the barrel 7 and the front tube 8, wherein the piston 71 can be attached to the shaft 9 by means of a pin 710. A return spring 72 is fitted around the shaft 9 in a central hole 70 of the barrel 7, between the piston 71 and the front tube 8, wherein a circumferential passage 61 that communicates with the central hole 70 of the barrel 7 is defined between the shaft 9 and the rear tube 6. A front end of the shaft 9 is formed into a drive lug 90 to be fitted with an accessory for a disc brake. A rear end of the shaft 9 is formed into a drive end 91 with an opening, which can be connected with a turning tool, such as wrenches, so that the shaft 9 can be rotated. A fluid circuit system, which generally includes a first fluid feed passage 15, a second fluid feed passage 50, a fluid supply passage 11, and a fluid return passage 14, is provided in the handle. The first fluid feed passage 15 is defined in the middle section 1 of the handle and connected with the fluid chamber 10. The second fluid feed passage 50 is defined in the upper section 5 of the handle and connected between the first fluid feed passage 15 and an inlet port 60 of the rear tube 6 that communicates with the circumferential passage 61. The fluid supply passage 11 is defined in the middle section 1 of the handle and connected between the fluid chamber 10 and the fluid reservoir 40. The return fluid passage 14 is defined in the middle section 1 of the handle and connected between a communication space 16 and the fluid reservoir 40 (see FIG. 3). In this embodiment, the communication space 16, which is located between the middle section 1 and the upper section 5, allows fluid communication between the first fluid feed passage 15, the second fluid feed passage 50, and the fluid return passage 14. A first check valve 12, including a first steel ball 120 and a compression spring 121, is provided at the fluid supply passage 11 to ensure fluid to unidirectionally flow from the fluid reservoir 40 to the fluid chamber 10, wherein the first steel ball 120 can be urged by the first compression spring 121 to normally close the fluid supply passage 11. A second check valve 13, which is provided at the first fluid feed passage 15 to allow fluid therein to flow in one direction, includes a second steel ball 130 and a second compression spring 131, wherein the second steel ball 130 can be urged by the second compression spring 131 to normally close the first fluid feed passage 15. More specifically, the operation lever 2 is connected by a pivot 24 to a post 23 fixed on the middle section 1 of the handle. Depressing the operation lever 2 allows the fluid contained in the fluid chamber 10 to flow upwardly to enter the central hole 70 of the barrel 7 via the first fluid feed passage 15, the second fluid feed passage 50, the inlet port 60, and the circumferential passage 61, so that the shaft 9 together with the piston can be pushed forward, and at the same time, the return spring 72 can be compressed. The spring 22 enables the operation lever 2 to return to its original position when releasing the operation lever 2. Preferably, the plunger 21 is pivotally connected to the operation lever 2 through a pin 20. A control valve 3 is provided at the fluid return passage 14 to control the fluid in contained in the fluid circuit system and the central hole 70 of the barrel 7 to return to the fluid reservoir 40. More specifically, the control valve 3 includes a steel ball 31, and a knob 32 provided with a threaded stem 30 capable of forcing against the steel ball 31, wherein the knob 32 is located outside of the middle section 1 of the handle. By turning the knob 32 in one direction, the fluid return passage 14 can be opened. By turning the knob 32 in a reverse direction, the fluid return passage 14 can be closed.

The fluid contained in the fluid reservoir 40, the fluid chamber 10, the central hole 70 of the barrel 7, and the first and second fluid feed passages 15, 50, the communication space 16, the inlet port 60, the circumferential passage 61 and the fluid return passage 14 is a chemically inert hydraulic fluid to transmit force and motion. FIG. 2 shows the tool of the present invention being filled with the fluid, before it is operated.

Figure 4:
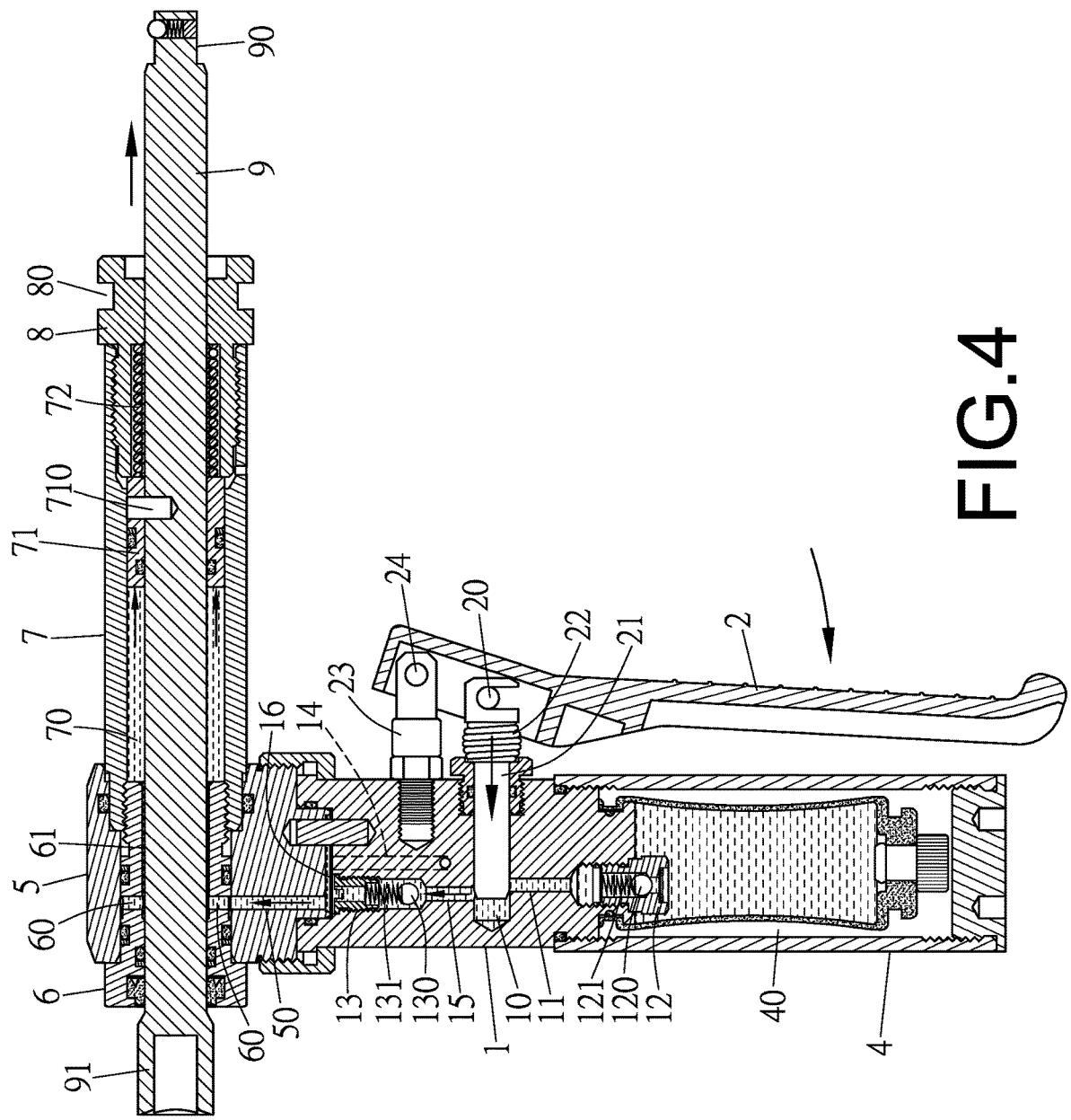
FIG. 4 shows a schematically operational view of the hydraulic brake caliper piston/plunger tool, wherein an operation lever of the tool is depressed.
Figure 5:
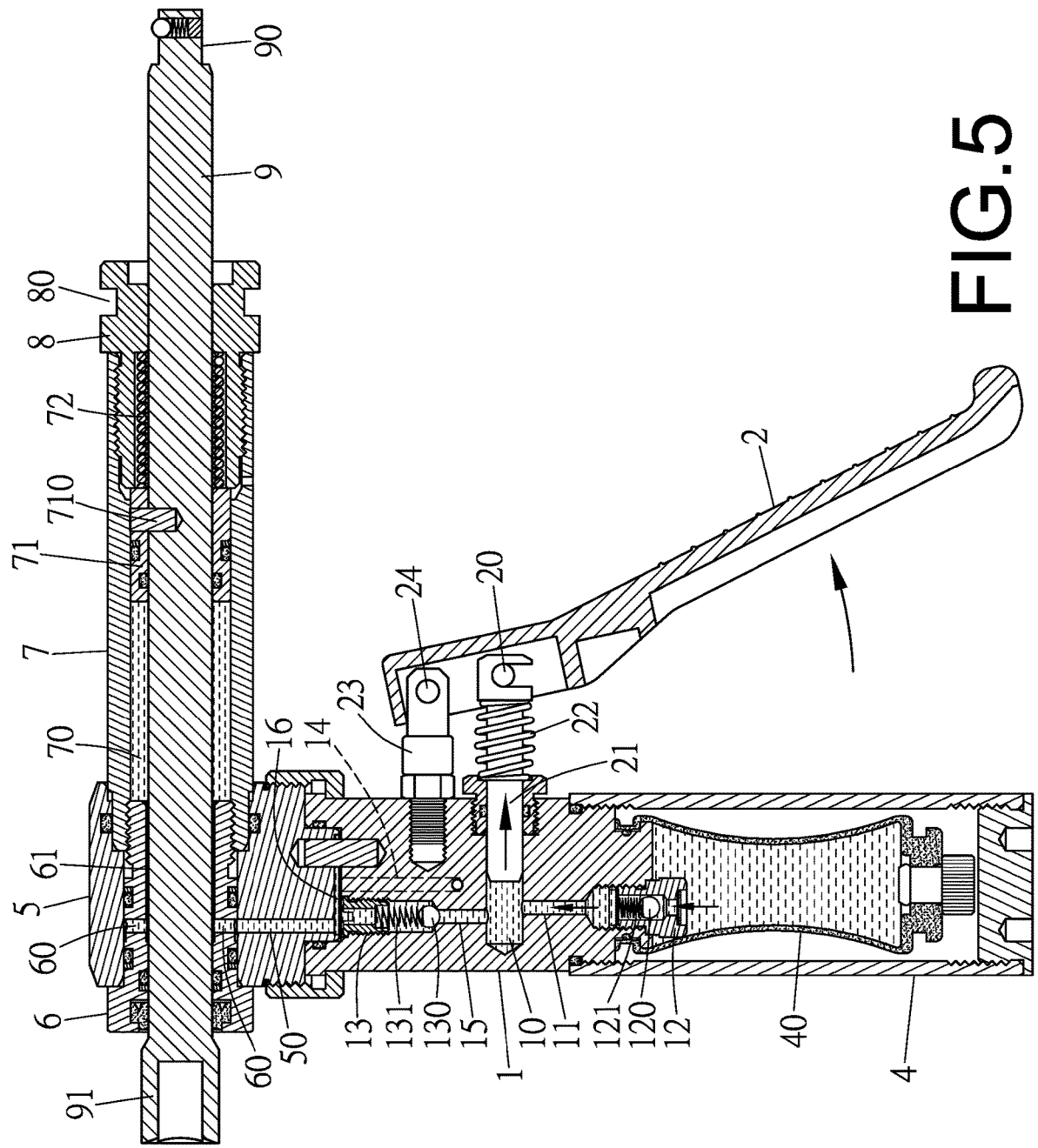
FIG. 5 shows a schematically operational view of the hydraulic brake caliper piston/plunger tool, wherein the operation lever is released.
Figure 7:
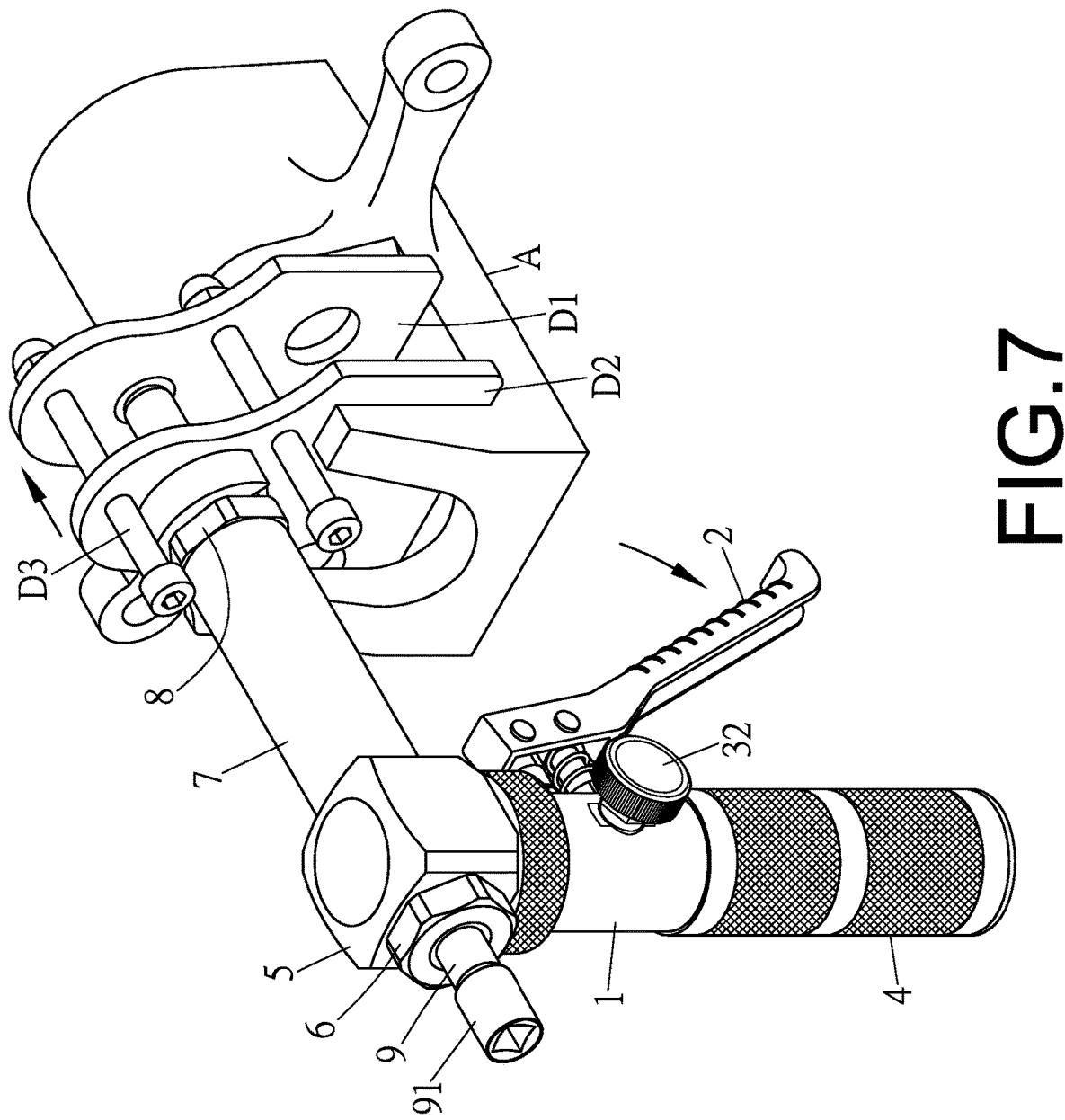
FIG. 7 shows a schematically operational view of the hydraulic brake caliper piston/plunger tool applied to a disc brake containing an unthreaded piston/plunger.
Figure 8:
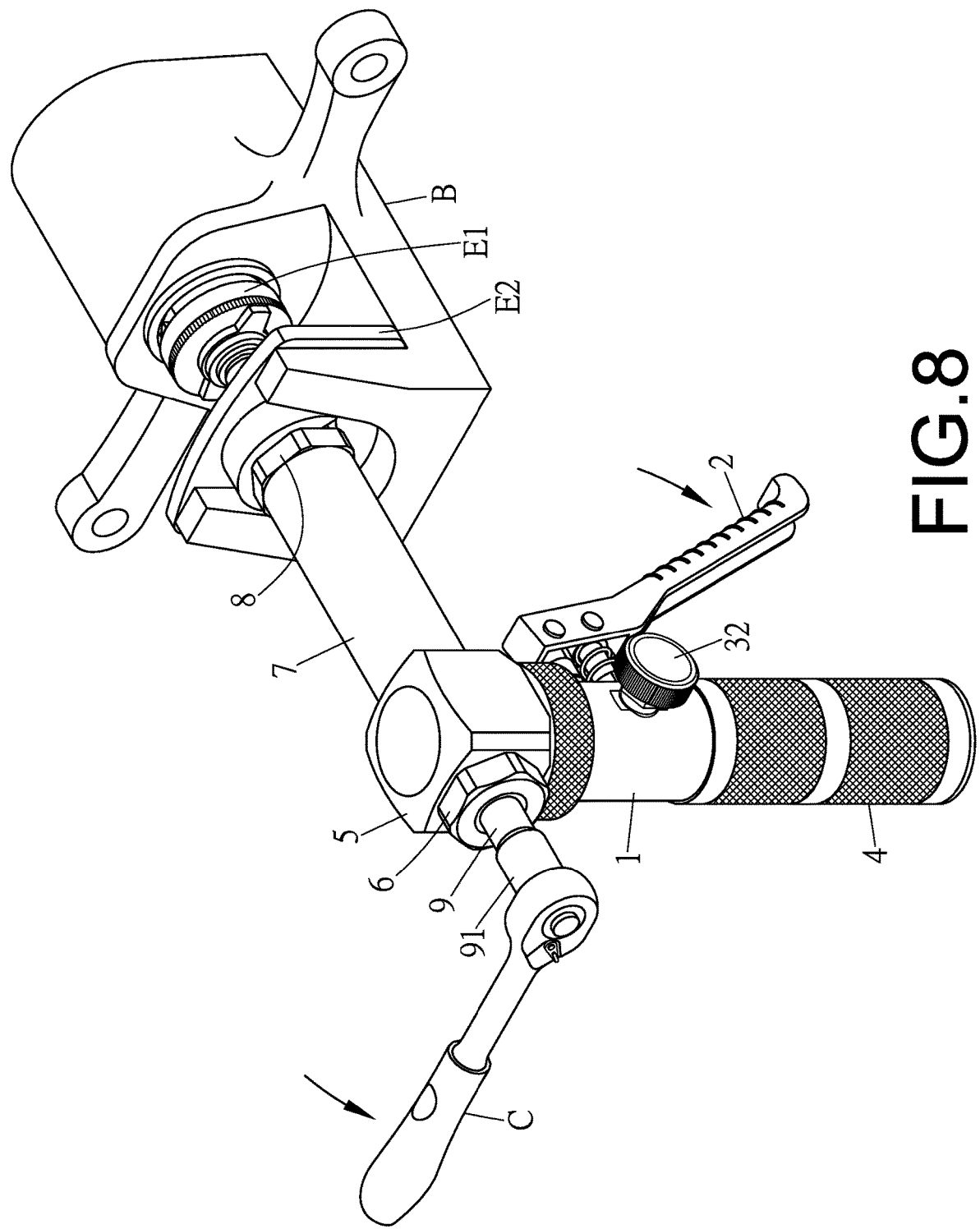
FIG. 8 shows a schematically operational view of the hydraulic brake caliper piston/plunger tool applied to a disc brake containing a threaded piston/plunger.

In an operation for pushing back an unthreaded piston/plunger into a disc brake caliper (A), as shown in FIG. 7, an accessory can be fitted on the front end of the shaft 9. The accessory includes a drive plate (D1), a fixed plate (D2), and a guide rod (D3) fixedly attached to the drive plate (D1) while slidably connected with the fixed plate (D2), wherein the drive plate (D1) is attached to the drive lug 90 of the shaft 9 to be in contact with the caliper's piston/plunger, whereas the fixed plate (D2) is fixed over a groove 80 of the front tube 8 and abuts against an outboard part of the caliper (A). Next, the operation lever 2 can be depressed to have the plunger 21 moved inwardly of the fluid chamber 10, as shown in FIG. 4. Under this condition, the first check valve 12 does not allow fluid to flow from the fluid chamber 10 to the fluid reservoir 40, while the second check valve 13 allows fluid to flow upwardly from the fluid chamber 10. As a result, the fluid contained in the fluid chamber 10 can be forced by the plunger 21 to flow through the first and second fluid feed passages 15, 50, the inlet port 60 and the circumferential passage 61 to enter the central hole 70 of the barrel 7 to push the piston 71 together with the shaft 9 to move forward. As the piston 71 moves forward, the return spring 72 can be compressed. When releasing the operation lever 2, as shown in FIG. 5, the spring 22 enables the operation lever 2 to return to its original position, so that the plunger 21 can be moved outwardly of the fluid chamber 10, thus causing the fluid to experience a vacuum suction force. As a result, the second check valve 13 can be closed, while the first check valve 12 can be opened to allow the fluid contained in the fluid reservoir 40 to flow into the fluid chamber 10 via the fluid supply passage 11. By alternately depressing and releasing the operation lever 2 for a number of cycles, the shaft 9 together with the piston 71 can be forced by fluid to advance to a certain extent, so that the piston/plunger of a disc brake can be pushed back into the associated caliper. It is easy to use the tool. For another type of disc brake caliper (B) containing a threaded piston/plunger, as shown in FIG. 8, another accessory can be used, which includes a drive disk (E1) and a fixed plate (E2), wherein the drive disk (E1) is fixed to the drive lug 90 of the shaft 9, whereas the fixed plate (E2) is fitted over the groove 80 of the front tube 8 and abuts against an outboard part of the caliper. For this type of disc brakes, a turning tool (C), such as wrenches, can be used to connect with the drive end 91 of the shaft 9. In use, the turning tool (C) can drive the shaft 9 to rotate simultaneously while the shaft 9 is moved forward by the operation lever 2, so that the piston/plunger can be screwed into the disc brake caliper. The hydraulic tool is labor-saving and easy to use, and can be applied to disc brakes containing either unthreaded pistons/plungers or threaded pistons/plungers. It is easy to use the tool.

Figure 6:
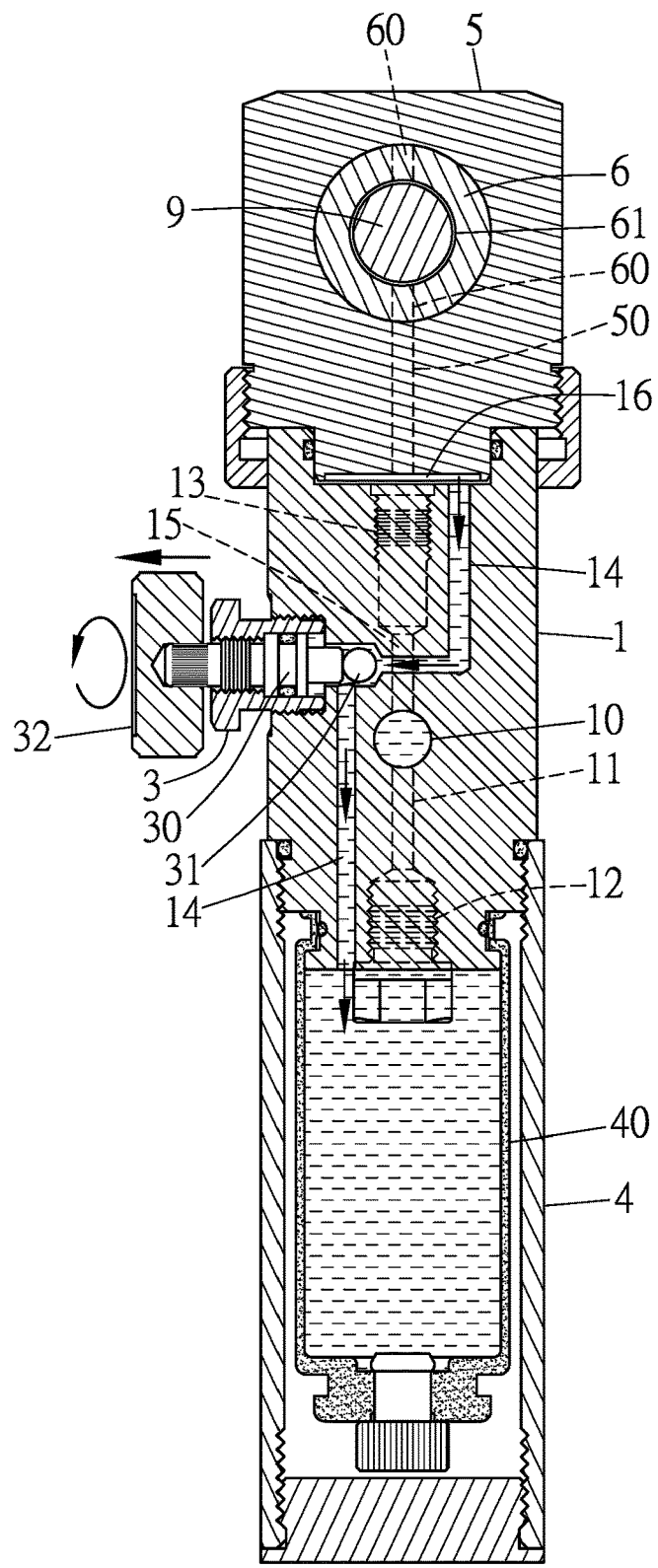
FIG. 6 shows a schematically operational view of the hydraulic brake caliper piston/plunger tool, wherein the control valve is operated to return fluid.

After the piston/plunger has been pushed back into the disc brake caliper, the user may turn the knob 32 of the control valve 3 in one direction such that the steel ball 31 is no longer urged by the stem 30, so that the fluid return passage 14 can be opened (see FIG. 6), so that the fluid contained in the central hole 70 of the barrel 7 can flow into the fluid reservoir 40 by way of the circumferential passage 61, the inlet port 60, the second fluid feed passage 50, and the fluid return passage 14. As the fluid flows back to the fluid reservoir 40, the compressed return spring 72 can force the piston 71 together with the shaft 9 to move backward to reach its original position. For a next operation, the control valve 3 can be turned in a reverse direction to close the fluid return passage 14, and in a similar way, a suitable accessory can be employed to have the shaft 9 moved forward again, with or without a turning tool. It is easy to use the tool.

While the invention has been described with reference to the preferred embodiment above, it should be recognized that the preferred embodiment is given for the purpose of illustration only and is not intended to limit the scope of the present invention and that various modifications and changes, which will be apparent to those skilled in the relevant art, may be made without departing from the scope of the invention.

What is claimed is:

1. A hydraulic brake caliper piston/plunger tool, comprising:
    a handle provided with a fluid reservoir and a fluid chamber, and pivotally connected with an operation lever;
    a barrel coaxially assembled with front and rear tubes respectively at two ends thereof, wherein the barrel and the rear tube are mounted at an upper section of the handle; and
    a shaft fixedly attached with a piston and fitted through the rear tube, the barrel and the front tube, wherein a return spring is fitted around the shaft in a central hole of the barrel, between the piston and the front tube, a circumferential passage that communicates with the central hole of the barrel is defined between the shaft and the rear tube, a front end of the shaft is adapted to be fitted with an accessory for a disc brake, and a rear end of the shaft is adapted to be connected with a turning tool for rotating the shaft;
    wherein a fluid circuit system is provided in the handle such that fluid chamber is communicated with the fluid reservoir and the circumferential passage, and the operation lever is spring-biased and provided with a plunger inserted into the fluid chamber;
    whereby alternately depressing and releasing the operation lever enables the plunger to force fluid to flow into the central hole of the barrel by way of the fluid circuit system and the circumferential passage, thus pushing the piston together with the shaft to move forward to push back a piston/plunger of the disc brake;
    wherein the fluid circuit system includes a first fluid feed passage, a second fluid feed passage, and a fluid supply passage, the first fluid feed passage defined in a middle section of the handle and connected with the fluid chamber, the second fluid feed passage defined in the upper section of the handle and connected between the first fluid feed passage and an inlet port of the rear tube that communicates with the circumferential passage, the fluid supply passage defined in the middle section of the handle and connected between the fluid chamber and the fluid reservoir; and
    wherein a communication space is defined between the upper and middle sections of the handle to communicate with the first and second fluid feed passages; the fluid circuit system further includes a fluid return passage defined in the middle section of the handle and connected between the communication space and the fluid reservoir.

2. The hydraulic brake caliper piston/plunger tool of claim 1, wherein the barrel together with the front and rear tubes is mounted substantially perpendicular to the handle.

3. The hydraulic brake caliper piston/plunger tool of claim 1, wherein the operation lever is pivotally connected to a post fixed on the middle section of the handle, and a spring is fitted around the plunger, between the handle and the operation lever, to enable the operation lever to retain to its original position when releasing the operation lever.

4. The hydraulic brake caliper piston/plunger tool of claim 1, wherein a first check valve is provided at the fluid supply passage to ensure fluid to unidirectionally flow from the fluid reservoir to the fluid chamber; a second check valve is provided at the first fluid feed passage to ensure fluid to unidirectionally flow from the fluid chamber to the central hole of the barrel.

5. The hydraulic brake caliper piston/plunger tool of claim 4, wherein each of first and second check valves includes a steel ball urged by a compression spring to normally close the corresponding passage.

6. The hydraulic brake caliper piston/plunger tool of claim 1, wherein a control valve is provided at the fluid return passage to control fluid to return to the fluid reservoir.

7. The hydraulic brake caliper piston/plunger tool of claim 6, wherein the control valve includes a steel ball, and a knob provided with a threaded stem capable of forcing against the steel ball, whereby turning the knob in one direction opens the fluid return passage, while turning the knob in a reverse direction closes the fluid return passage.

8. The hydraulic brake caliper piston/plunger tool of claim 1, wherein the handle is provided with the fluid reservoir in a lower section thereof and the fluid chamber in the middle section thereof, and is pivotally connected with the operation lever at the middle section.

* * * * *